No. 894,981. PATENTED AUG. 4, 1908.
T. PONSAR & C. C. A. BAUERCAMPER.
ENSILAGE CUTTER.
APPLICATION FILED MAR. 2, 1907.

2 SHEETS—SHEET 1.

Theodore Ponsar
and
Charles C. A. Bauercamper, Inventors

Witnesses:
J. M. Shiamek
J. H. Short

By David O. Barwell
Attorney

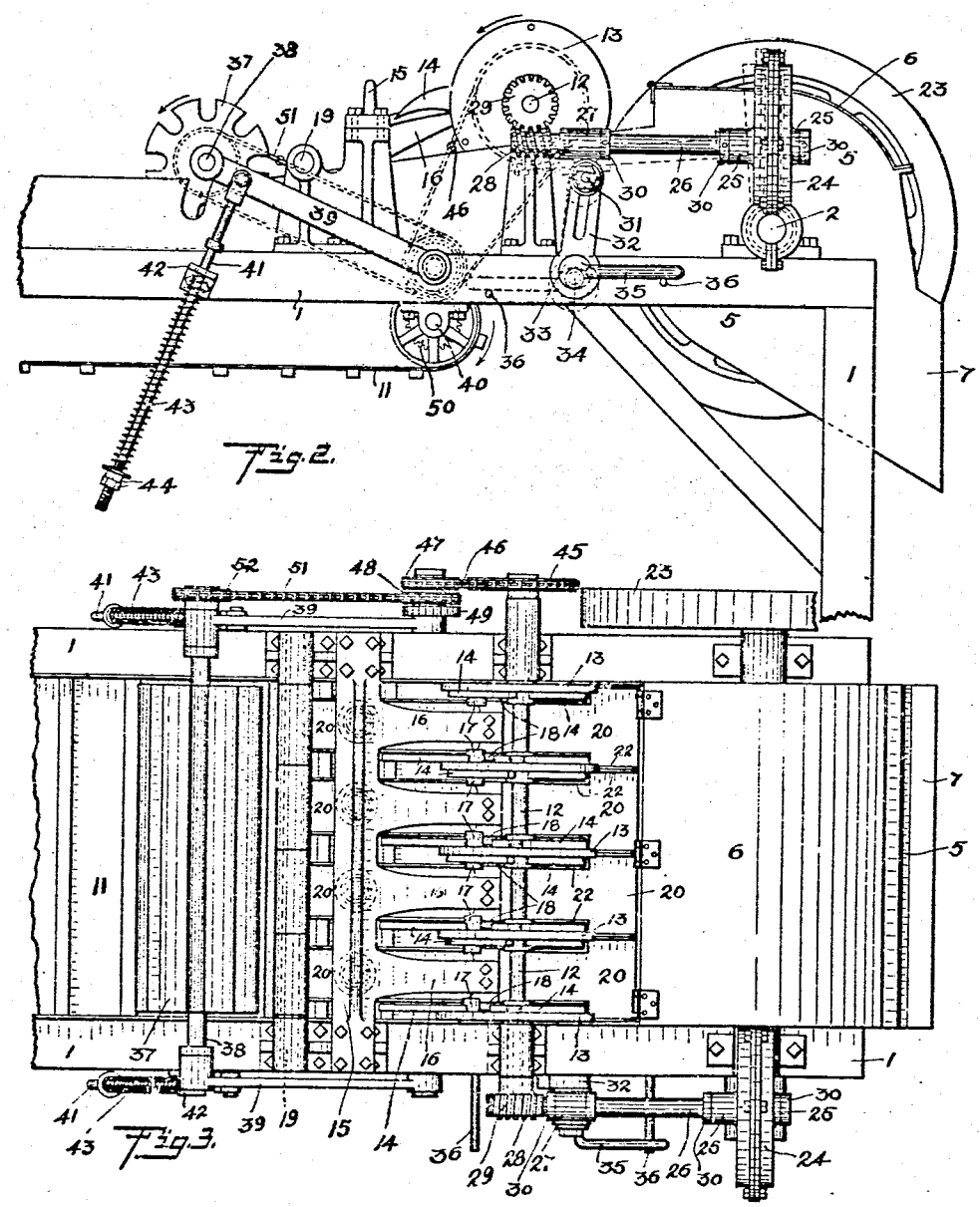

_UNITED STATES PATENT OFFICE._

THEODORE PONSAR, OF SOUTH OMAHA, AND CHARLES C. A. BAUERCAMPER, OF OMAHA, NEBRASKA.

ENSILAGE-CUTTER.

No. 894,931.

Specification of Letters Patent.

Patented Aug. 4, 1908.

Application filed March 2, 1907. Serial No. 360,295.

_To all whom it may concern:_

Be it known that we, THEODORE PONSAR and CHARLES C. A. BAUERCAMPER, citizens of the United States, and residents, respectively, of South Omaha and Omaha, in the county of Douglas and State of Nebraska, have invented certain new and useful Improvements in Ensilage-Cutters, of which the following is a specification.
Our invention relates to the class of machines generally known as ensilage cutters or silo fillers.

It is the object of our invention to provide a machine of this class especially adapted for the cutting of various forage crops, such as alfalfa, clover or the like, which have been cured and baled and which it is desired to cut into uniform sections preparatory to further cutting, grinding or crushing operations necessary in the production of alfalfa meal and the like.

Although especially adapted for the above purpose our machine may be advantageously employed for the cutting of materials in the green state as properly used for ensilage.

Our invention has particular reference to the feeding devices which are arranged to receive mats of varying thickness of the materials, as fed from the broken bales, to carry the mats to the cutter blades, drive the same thereinto at a speed proportional to the speed of the cutter blades, and retain a hold on the mats until the extreme rearward portion thereof is engaged and cut by the blades into uniform lengths.

In the accompanying drawings Figure 1 is a longitudinal section of a machine of the class described, showing the portion thereof embodying our invention. Fig. 2 is a side elevation thereof, and Fig. 3 is a plan view of the same.

In the construction shown we provide a suitable frame 1 upon which, near one end thereof, is mounted a shaft 2 which carries a cutting reel consisting of spiders 4 carrying a number of helical cutter blades 3, as shown in Fig. 1. The cutting reel is inclosed by a casing 5 having a hinged lid 6 and a discharge spout 7.
At the rearward side of the cutting reel is a transversely extending bar 8 which carries the fixed cutter blade 9 in a position to co-operate with the helical cutter blades on the reel. From the transverse bar 8 a table 10 extends rearwardly, curving slightly downward and terminating adjacent the front end of the horizontal slat conveyer 11.

Above the curved portion of the table 10 is a transversely extending shaft 12 carrying a number of disks 13 on which are loosely pivoted the feed fingers 14. Each of said feed fingers consists of a horn-shaped body carried by a shank extending approximately at right angles to the longitudinal axis of the horn-shaped body, said shank having a curved heel surface of a radius slightly less than that of the disks 13. Behind the disks 13 is a transversely extending beam 15 from the front side of which brackets 16 extend forwardly between the disks and support the cams 17 and rollers 18 adjacent the disks, as shown in Figs. 1 and 3. As the disks 13 are turned in the direction indicated by the arrow in Fig. 1, the curved heel surfaces of the feed fingers are engaged by the cams 17 and turned outwardly as shown by the rearward finger in Fig. 1. The fingers are maintained in this outwardly-turned position, by engagement with the said cams and the rollers 18, until the points thereof reach a position in advance of a vertical line passing through the center of the shaft 12, whereupon, passing out of engagement with the rollers and meeting with a certain resistance from the materials engaged thereby, the fingers are drawn up almost vertically out of the material and have no tendency to carry the same up with them.

Behind and slightly below the transverse beam 15 is a shaft 19 to which are pivotally connected the pressure plates 20 which extend forwardly therefrom, below the beam 15 and between the disks 13, terminating adjacent the cutting reel and above the fixed cutter blade 9. In the under side of the beam 15 are formed suitable pockets or cups in which are held coil springs 21 which bear upon the plates 20 and yieldably press the same downward. By upward pressure from materials passing through the feed throat formed between the plates 20 and the table 10, said plates may be raised to a position as shown by dotted lines in Fig. 1. As any of the plates may be depressed while an adjoining plate is in raised position, the side shields 22 are provided at the adjoining edges of the plates. Said shields 22 being of a height slightly greater than the total movement of the plates, any opening from beneath one plate and over the top of another is prevented and the materials confined within the feed throat.

The machine may be conveniently driven by a belt applied to the fly-wheel pulley 23 carried on the shaft 2. On one end of the shaft 2 is a worm, the same engaging a worm-wheel, both worm and worm-wheel being indicated by dotted lines in Fig. 2 and being inclosed in an ordinary worm-and-worm-wheel-casing 24 having a lower portion surrounding the shaft 2 and worm, and there being bearings 25 formed in the upper part thereof for the worm-wheel-shaft 26. The rearwardly extending portion of the shaft 26 passes through a bearing 27 and has formed at the end thereof a worm 28 adapted to engage a worm-wheel 29 placed on the end of the shaft 12. Collars 30 are placed on the shaft 26 at each side of the bearings 25 and 27, for holding said parts in proper relative position. On the under side of the bearing 27 is a transversely extending portion through which passes a sleeve and bolt 31 by which the bearing is adjustably connected with the slotted arm 32. At the lower end of the slotted arm 32 is a circular portion inclosing an eccentric 33 which is connected by the stud 34 with the frame 1. The eccentric 33 is provided with a handle 35 which may be turned to the position shown by dotted lines in Fig. 2, thus drawing downwardly the slotted arm, the bearing 27 and shaft 26, tilting the casing 24 about the axis of the shaft 2 and disengaging the worm 28 from the worm-wheel 29, as also indicated by dotted lines in Fig. 2. By thus engaging or disengaging the driving connection between the cutter shaft 2 and the feed shaft 12 the feeding of materials may be started or stopped at the will of the operator. Pins 36 are provided on the frame 1 on which the handle 35 may rest at its extremes of movement. By adjusting the position of the bearing 27 relative to the slotted arm 32, different sized worm-wheels may be placed on the shaft 12 and the speed ratios between the shafts 2 and 12 thus varied.

To facilitate the feeding of loose materials by compressing the same into compact masses which may be readily engaged and driven through the feed throat by the fingers 14, the yieldingly-impressed corrugated roller 37 is provided, the same being disposed transversely above the slat conveyer and immediately behind the shaft 19. The shaft 38 of said corrugated roller is journaled in the ends of the radius bars 39 which are pivotally connected with the frame 1 above the conveyer shaft 40. Near the rearward ends of the radius bars are connected the rods 41 which extend downwardly therefrom through the brackets 42 on the frame, coil springs 43 being placed around the rods below the said brackets and bearing on washers placed above the adjusting nuts 44 near the lower ends of the rods, the radius bars and corrugated roller being thus yieldingly pulled downwardly by the tension of said springs 43. The slat conveyer and corrugated roller may be conveniently driven by the means shown in Figs. 2 and 3, in which is represented a sprocket 45 placed on the shaft 12, a chain 46 extending therefrom and driving a sprocket 47 working loosely on the stub shaft employed for pivoting one of the radius bars 39. A second sprocket 48 and a gear 49 are connected with and driven by the sprocket 47, the gear 49 meshing with a gear 50 on the conveyer shaft 40, and the sprocket 48 being connected by a chain 51 with a sprocket 52 on the shaft 38. The shafts 38 and 40 are thus driven and the conveyer and corrugated roller actuated in the directions indicated.

The operation of the machine will be apparent from the foregoing. Materials placed upon the slat conveyer 11 are carried forward thereby to the table 10 and, entering the throat formed between the said table and the yieldably impressed plates 20, are engaged by the feed fingers 14 and pushed thereby through the throat to the engaging edges of the fixed and rotary cutter blades. Masses or mats of the materials, as disengaged from bales or as compressed between the corrugated roller and conveyer, are securely held by the ends of the pressure plates 20 until the last portions of said mats or masses are engaged and cut by the blades, thus preventing the discharging from the machine of uncut masses such as are constantly thrown out by machines of this class employing roller feed mechanism in which the hold of the mat is lost at a distance from the cutter blades equal to at least the radius of the feed rollers. The pressure plates 20 being independently actuated are enabled to compensate variations in the thickness of mats and to retain a firm hold across the entire width of the mat until the last portion thereof has passed out of the feed throat and been engaged by the cutting mechanism.

Now, having described our invention, what we claim and desire to secure by Letters Patent is:

1. In a machine of the class described, the combination with a fixed cutter blade, and movable cutter blades coöperating therewith, of an immovable imperforate table connecting with said fixed cutter blade, a plurality of yieldably impressed plates disposed above said table, revoluble disks arranged above the plates, and feed fingers carried by said disks and extending between said plates; said fingers being adapted to engage materials held between the table and plates and force the same toward the cutter blades.

2. In a machine of the class described, a rotary cutting reel, a feed throat leading thereto, said feed throat being formed by a fixed table and a plurality of yieldably impressed plates arranged above said table, revoluble disks arranged above said plates, feed fingers carried by said disks and extending into the feed throat to actuate materials therein toward the cutting reel, and driving mechanism connecting the cutting reel and the disks.

3. In a machine of the class described, the combination with cutting devices of a feed throat leading thereto, said feed throat being formed by a fixed bottom plate and a plurality of yieldably impressed plates arranged above said bottom plate, revoluble disks arranged above said yieldably impressed plates, feed fingers pivotally connected with said disks and adapted to extend between the yieldably impressed plates into the feed throat for actuating materials therein toward the cutting devices, cams controlling the movement of said feed fingers, and driving mechanism connecting said cutting devices and revoluble disks.

4. In a mechanism of the class described, cutting devices, a feed throat leading thereto, feed fingers arranged to work into said throat for forcing materials through the same toward the cutting devices, driving mechanism including a worm and worm-wheel between the cutting devices and feed fingers, and means for disconnecting said worm and worm-wheel, said means comprising a shaft carrying the worm, a bearing for said shaft arranged adjoining the worm, and an eccentric connected with said bearing for changing the position thereof relative to the worm-wheel.

5. In a mechanism of the class described, a fixed cutter blade, rotary cutter blades coöperating therewith, an imperforate table connecting with said fixed cutter blade, yieldably impressed plates coöperating with the table and fixed cutter blade to form a distensible feed throat, revoluble feed fingers for actuating materials over said table through the feed throat toward the cutter blades, and means for compressing materials into compact masses before the same enter the feed throat.

In testimony whereof we have hereunto affixed our signatures in the presence of two witnesses.

THEODORE PONSAR.
CHARLES C. A. BAUERCAMPER.

Witnesses:
D. O. BARNELL,
AXEL SUND.